United States Patent
Guo

(10) Patent No.: US 11,978,145 B2
(45) Date of Patent: May 7, 2024

(54) EXPRESSION GENERATION FOR ANIMATION OBJECT

(71) Applicant: Tencent Technology (Shenzhen) Company Limited, Guangdong (CN)

(72) Inventor: Chang Guo, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 55 days.

(21) Appl. No.: 17/880,615

(22) Filed: Aug. 3, 2022

(65) Prior Publication Data

US 2022/0375150 A1    Nov. 24, 2022

Related U.S. Application Data

(63) Continuation of application No. PCT/CN2021/102775, filed on Jun. 28, 2021.

(30) Foreign Application Priority Data

Aug. 14, 2020   (CN) ............................ 202010820517

(51) Int. Cl.
  *G06T 13/40*   (2011.01)
  *G06V 40/16*   (2022.01)
(52) U.S. Cl.
  CPC ............ *G06T 13/40* (2013.01); *G06V 40/174* (2022.01)
(58) Field of Classification Search
  CPC ................................. G06T 13/40; G06V 40/174
  See application file for complete search history.

(56) References Cited

U.S. PATENT DOCUMENTS

| 8,207,971 B1* | 6/2012 | Koperwas ............... G06T 13/40 345/475 |
| 8,860,731 B1 | 10/2014 | Cohen Bengio et al. |
| 2003/0179204 A1* | 9/2003 | Mochizuki .............. G06T 13/40 345/473 |

FOREIGN PATENT DOCUMENTS

| CN | 102819856 A | 12/2012 |
| CN | 107657651 B | 6/2019 |
| CN | 111899319 A | 11/2020 |

OTHER PUBLICATIONS

Acharya et al., An Efficient Three-Dimensional Animation Film on The Autobiographies of Differently Abled Person, Indian Journal of Science and Technology, vol. 9(32), Aug. 2016 (Year: 2016).*

Cosmas et al., Creative Tools for Producing Realistic 3D Facial Expressions and Animation, International Journal of Creative Computing, 2016 (Year: 2016).*

(Continued)

*Primary Examiner* — Charles Tseng
(74) *Attorney, Agent, or Firm* — ARENTFOX SCHIFF LLP

(57) ABSTRACT

An expression generation method for an animation object is provided. In the method, a first facial expression of a target animation object is acquired by a first animation application from a facial expression set generated by a second animation application. The facial expression set includes different facial expressions of the target animation object. A display parameter of the acquired first facial expression in the first animation application is adjusted based on a first user input to obtain a second facial expression of the target animation object. A target animation of the target animation object that includes an image frame of the second facial expression is generated.

20 Claims, 9 Drawing Sheets

Perform face binding on a target animation object in a first animation application — S302

Acquire a first facial expression of the target animation object in the first animation application, the first facial expression being a facial expression in a facial expression set, and the facial expression set including different facial expressions of the target animation object that are generated in a second animation application — S304

Adjust, in response to a first interactive operation acquired in the first animation application, a display parameter of the first facial expression in the first animation application to obtain a second facial expression, the second facial expression being a facial expression of the target animation object in one frame of image of a target animation, and the target animation object being used for generating the target animation — S306

(56) References Cited

OTHER PUBLICATIONS

International Search Report issued Sep. 28, 2021 in PCT/CN2021/102775 with English translation, pp. 1-14.
Qin, Chunlei, et al. Design and Implementation of 3DSMax Based on Expression Animation for Coalmine Accident Rescue Game-Based Training System Proceedings of the AECC Symposium, vol. 20, Aug. 1, 2007, pp. 7-8, 23.
Bian, Fangming, Skillful Use of Facial Expression in Animation—An Introduction of Combined Production of FaceGen Modeller and Maya, Television Caption Effects Animation, Sep. 15, 2007 pp. 39-41.

* cited by examiner

First facial expression 501    Second facial expression 502

First facial expression 601    Second facial expression 602

First facial expression 701    Second facial expression 702

EXPRESSION GENERATION FOR ANIMATION OBJECT

RELATED APPLICATIONS

The present application is a continuation of International Application No. PCT/CN2021/102775, filed on Jun. 28, 2021, which claims priority to Chinese Patent Application No. 202010820517.0, filed on Aug. 14, 2020. The entire disclosures of the prior applications are hereby incorporated by reference in their entirety.

FIELD OF THE TECHNOLOGY

This disclosure relates to the computer field, including an expression generation method and apparatus for an animation object, a storage medium, and an electronic device.

BACKGROUND OF THE DISCLOSURE

In some games, an expression needs to be created for a game role. For example, in some games on the market, when an expression is created for a role, numerous skeletal points are established and skinned in 3ds MAX or Maya, and a shape of a face is changed through zooming, rotation, and displacement of the skeleton.

However, due to manual control, during expression creation, it can be difficult to directly judge and adjust final effects during early-stage design, and it can be difficult to accurately adjust each expression during post production. In addition, it may not be possible to adjust many points to the same position when making the same expression. This can waste a substantial amount of time, and effects may not always be good. As shown in FIG. 1, FIG. 1 is a schematic diagram of changing an appearance of a face through zooming, rotation, and displacement of the skeleton. In FIG. 1, many skeletal points on the face participate in skinning, and each point controls only a small part of muscles on the face. During role expression creation, expression adjustment efficiency is low, and effects are poor.

SUMMARY

Embodiments of this disclosure include an expression generation method and apparatus for an animation object, a storage medium, and an electronic device, which can improve production efficiency of a role expression, and improve production effects of the role expression.

An embodiment of this disclosure provides an expression generation method for an animation object. In the method, a first facial expression of a target animation object is acquired by a first animation application from a facial expression set generated by a second animation application. The facial expression set includes different facial expressions of the target animation object. A display parameter of the acquired first facial expression in the first animation application is adjusted based on a first user input to obtain a second facial expression of the target animation object. A target animation of the target animation object that includes an image frame of the second facial expression is generated.

An embodiment of this disclosure provides an expression generation apparatus. The expression generation apparatus includes processing circuitry that is configured to execute a first animation application. The first animation application is configured to acquire a first facial expression of a target animation object from a facial expression set generated by a second animation application. The facial expression set includes different facial expressions of the target animation object. The processing circuitry is configured to adjust a display parameter of the acquired first facial expression in the first animation application based on a first user input to obtain a second facial expression of the target animation object. Further, the processing circuitry is configured to generate a target animation of the target animation object that includes an image frame of the second facial expression.

An embodiment of this disclosure provides a non-transitory computer-readable storage medium storing instructions which when executed by at least one processor cause the at least one processor to perform acquiring, by a first animation application, a first facial expression of a target animation object from a facial expression set generated by a second animation application, the facial expression set including different facial expressions of the target animation object. The instructions cause the at least one processor to perform adjusting a display parameter of the acquired first facial expression in the first animation application based on a first user input to obtain a second facial expression of the target animation object. Further, the instructions cause the at least one processor to perform generating a target animation of the target animation object that includes an image frame of the second facial expression.

An embodiment of this disclosure provides a computer program product or a computer program, the computer program product or the computer program includes computer instructions, and the computer instructions are stored in a computer-readable storage medium. A processor of a computer device reads the computer instruction from the computer readable storage medium, and the processor executes the computer instruction, so that the computer device performs the foregoing expression generation method for an animation object.

An embodiment of this disclosure provides an electronic device, including a memory, a processor, and a computer program that is stored in the memory and that can run on the processor. The processor is configured to perform the expression generation method for an animation object by using the computer program.

According to the embodiments of this disclosure, when a facial expression of a target animation object is created, first face binding is performed on the target animation object in a first animation application, and then a first facial expression of the target animation object is acquired in the first animation application, where the first facial expression is a facial expression in a facial expression set, and the facial expression set includes different facial expressions of the target animation object that are generated in a second animation application. Finally, when a first interactive operation is acquired in the first animation application, in response to the first interactive operation, a display parameter of the first facial expression is adjusted in the first animation application to obtain a second facial expression. In one image frame of a to-be-generated target animation in the first animation application, the second facial expression may be used as a facial expression of the target animation object. By using the foregoing technical solutions, a facial expression set of a target animation object produced in a second animation application may be acquired, and then a display parameter of a first facial expression of the target animation object is adjusted in a first animation application to obtain a second facial expression, so that the second facial expression can be used as a facial expression of the target animation object in a image frame of a to-be-generated target animation. In this way, the display parameter of the first facial expression is adjusted to obtain the second facial expression, thereby improving facial expression production efficiency, and the second facial expression is generated based on fine adjustment of the first facial expression, so that a difference between the second facial expression and the first facial expression is relatively small, and facial expression changes of the target animation object in a image frame of the to-be-generated target animation are more smooth, thereby improving animation smoothness and improving display effects.

DESCRIPTION OF EMBODIMENTS

Figure 1:
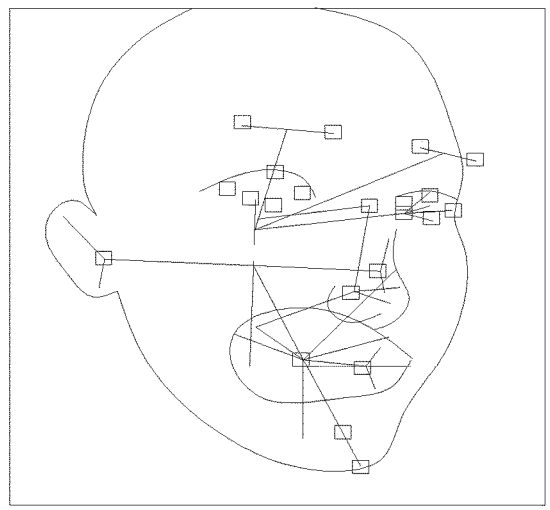
FIG. 1 is a schematic diagram of a related skeletal point for creating an expression of a game role.

The following describes technical solutions in embodiments of this disclosure with reference to the accompanying drawings. The described embodiments are merely some but not all of the embodiments of this disclosure. Other embodiments are within the protection scope of this disclosure.

In the disclosure, the claims, and the accompanying drawings of this disclosure, the terms "first," "second," and the like are intended to distinguish between similar objects but do not necessarily indicate a specific order or sequence. It is to be understood that the data used in this way are interchangeable in an appropriate case, so that the embodiments of this disclosure described herein can be implemented in an order other than the order illustrated or described herein. Moreover, the terms "include," "contain," and any other variants thereof are intended to cover a non-exclusive inclusion, for example, a process, method, system, product, or device that includes a list of steps or units and is not necessarily limited to those steps or units, but may include other steps or units not expressly listed or inherent to such a process, method, product, or device.

Technical terms involved in embodiments of this disclosure include the following:

1. WarChess games: WarChess games include turn-based, role-playing games where you move your character around the map by grid to fight. Because this game is like playing chess, it can be referred to as a turn-based WarChess games, and can be referred to as role playing strategies (strategies RPG, SRPG, SRPG). It generally supports PC\Mac\Ubuntu multi-end synchronization experience. WarChess games focus on strategies, the pace is slow and time-consuming, but most of the games are beautifully produced, have gorgeous graphics, more characters and skills, and have no high requirements for players' reaction.

2. 3ds MAX: 3D Studio Max, commonly referred to as 3D Max or 3ds MAX for short, includes three-dimensional animation rendering and production software based on a PC system developed by Discreet (later merged by Autodesk). Its predecessor is 3D Studio series software based on the DOS operating system. It can be applied to three-dimensional modeling rendering and animation production.

3. Maya is a relatively high-order and complex three-dimensional computer graphics software, and is widely used in digital special effects creation such as movies, television series, advertising, computer games, and television games. Maya is a high-end production software at the movie level with perfect functions, flexible work, easy to learn and use, high production efficiency, and high sense of rendering reality. It not only includes general three-dimensional and visual effects production functions, but also combines with advanced modeling, digital cloth simulation, hair rendering, and motion matching technologies.

4. Blend Shape is tool software for making facial expression animation. It can obtain a very smooth and high-precision deformation effect of a basic object by using a series of target shape objects (Target). It is can be very useful in role animation, especially in expression creation. In a role movement process, Blend Shape may also be used for controlling muscle deformation at a joint during movement, which is much more convenient than simply increasing weights plus lattice deformation control.

Figure 2:
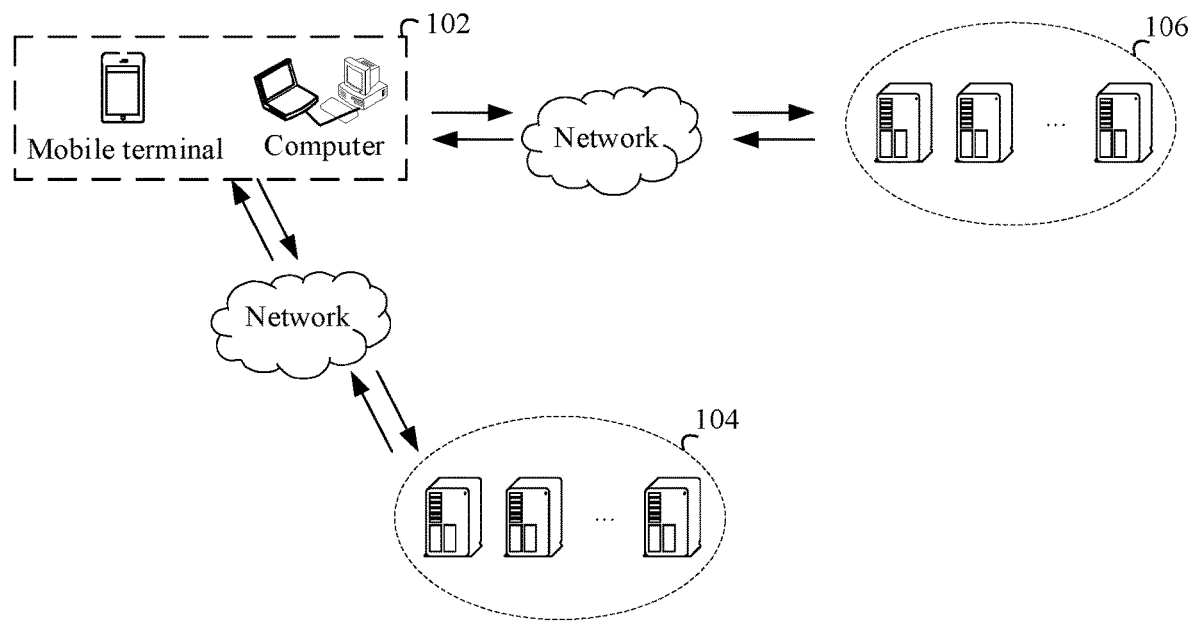
FIG. 2 is a schematic diagram of an application environment of an expression generation method for an animation object according to an embodiment of this disclosure.

Expression generation methods for an animation object provided in this disclosure may be applied to an application environment shown in FIG. 2, but is not limited thereto. As shown in FIG. 2, a face binding is performed on a target animation object in a first animation application of a terminal device 102; a first facial expression of the target animation object is acquired in the first animation application, the first facial expression being a facial expression in a facial expression set; and a first interactive operation is acquired from the first animation application of the terminal device 102, and a server 104 adjusts, in response to the first interactive operation acquired in the first animation application, a display parameter of the first facial expression to obtain a second facial expression, the second facial expression being a facial expression of the target animation object in one image frame of a target animation, and the target animation object being used for generating the target animation. A server 106 is configured to store the facial expression set, the facial expression set including different facial expressions of the target animation object that are generated in a second animation application. It is to be understood that the foregoing is merely an example. Embodiments of this disclosure are not limited to this example.

The method in this embodiment of this disclosure may be applied to a game product, for example, a game product of a mobile terminal (e.g., a mobile phone terminal), and includes but is not limited to game products of all portable game devices.

The terminal device may be a terminal device on which a target client is configured, and may include but is not limited to at least one of the following: a mobile phone (e.g., an Android mobile phone or an iOS mobile phone), a notebook computer, a tablet computer, a palmtop computer, a mobile Internet device (MID), a PAD, a desktop computer, or a smart TV. The target client may be a video client, an instant messaging client, a browser client, an education client, or the like. The network may include, but is not limited to, a wired network and a wireless network. The wired network can include a local area network, a metropolitan area network, and a wide area network. The wireless network can include Bluetooth, Wi-Fi, and other networks that implement wireless communication. The server may be a single server, a server cluster including a plurality of servers, or a cloud server. The foregoing description is merely an example.

Figure 3:
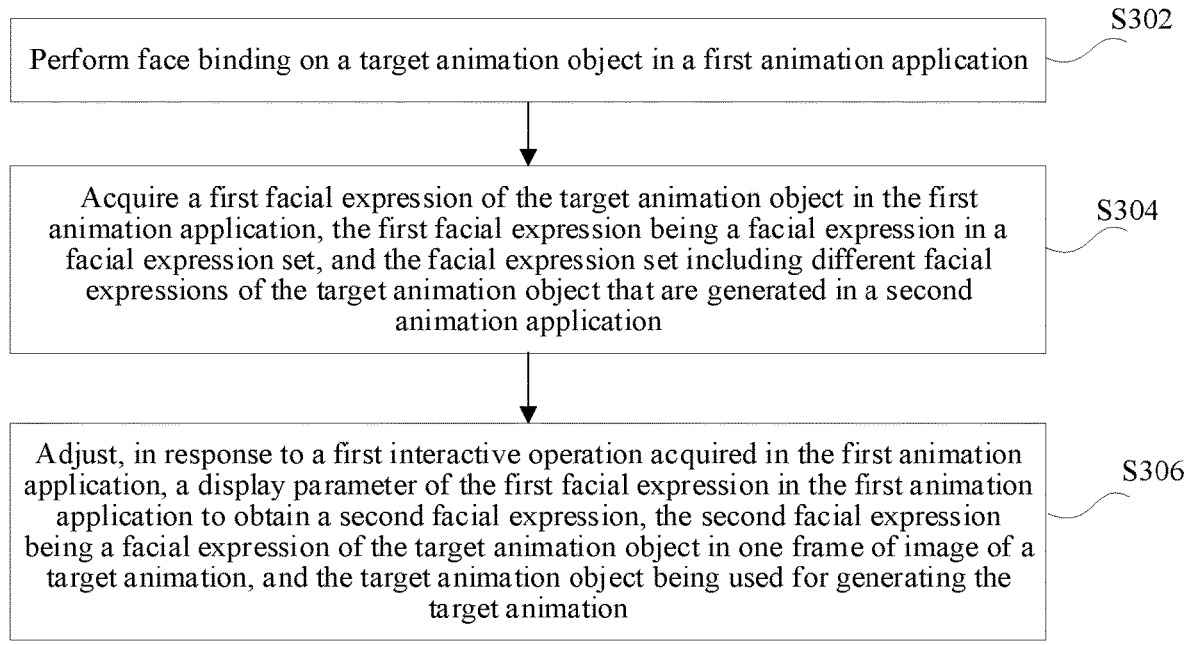
FIG. 3 is a schematic flowchart of an expression generation method for an animation object according to an embodiment of this disclosure.

The expression generation method for an animation object may be performed by a server, may be performed by a terminal device, or may be performed jointly by a server and a terminal device. Execution by a terminal device (e.g., the terminal device 102) is used as an example for description. As shown in FIG. 3, a procedure of the foregoing expression generation method for an animation object may include the following steps:

In Step S302, face binding is performed on a target animation object in a first animation application.

In step S304, a first facial expression of the target animation object is acquired in the first animation application. The first facial expression can be a facial expression in a facial expression set, and the facial expression set can include different facial expressions of the target animation object that are generated in a second animation application.

In step S306, in response to a first interactive operation acquired in the first animation application, a display parameter of the first facial expression is adjusted to obtain a second facial expression. The second facial expression can be a facial expression of the target animation object in one image frame of a target animation, and the target animation object can be used for generating the target animation.

In some embodiments, the first animation application may be three-dimensional animation rendering and production software, such as 3ds Max. The second animation application may be three-dimensional computer graphics software, such as Maya.

Figure 4:
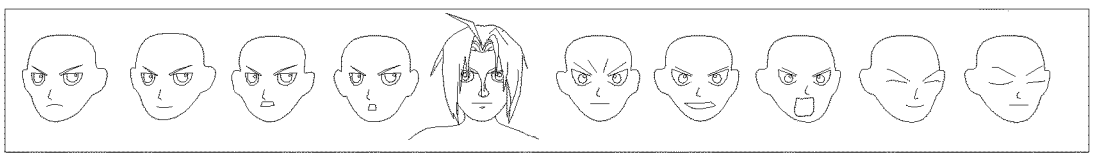
FIG. 4 is a schematic diagram of a facial expression set according to an embodiment of this disclosure.

The target animation object may be a virtual game role or virtual character. As shown in FIG. 4, the first facial expression may correspond to joy, anger, grief, happiness, surprise, or the like. If the target animation object is a relatively important role in a game product, another small expression that carries a character feature of the target animation object, such as shyness, excitement, and greed, can be added. It may be understood that the first facial expression is not limited to the examples in this disclosure.

When creating the facial expression of the target animation object, the target animation object needs to be bound in the first animation application.

Then, the first facial expression of the target animation object is obtained from the first animation application such as 3ds Max, the first facial expression being one facial expression in the facial expression set, and the facial expression set including different facial expressions of the target animation object that are generated in the second animation application. When the first interactive operation is obtained in the first animation application, in response to the first interactive operation, the display parameter of the first facial expression is adjusted in the first animation application, so as to obtain the second facial expression. When the to-be-generated target animation is created, the second facial expression may be used as the facial expression of the target animation object in one image frame of the to-be-generated target animation.

Figure 5:
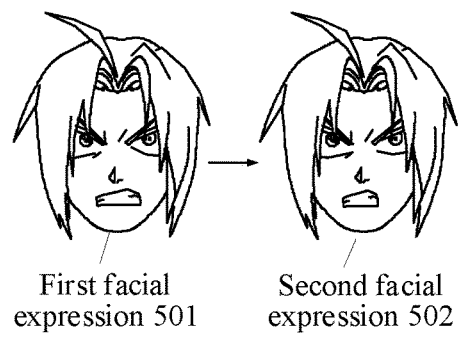
FIG. 5 is a first schematic diagram of a first facial expression and a second facial expression according to an embodiment of this disclosure.

For example, as shown in FIG. 5, a first facial expression (anger) 501 may be adjusted in the first animation application to obtain a second facial expression (anger) 502. The second facial expression 502 can differ from the first facial expression 501. For example, compared with the first facial expression 501, the mouth of the second facial expression 502 can be smaller than the mouth of the first facial expression 501, bending degrees of the lower eyelids of the second facial expression 502 and the first facial expression 501 can also slightly differ, and the bending degree of the lower eyelid of the second facial expression 502 can be softer.

Figure 6:
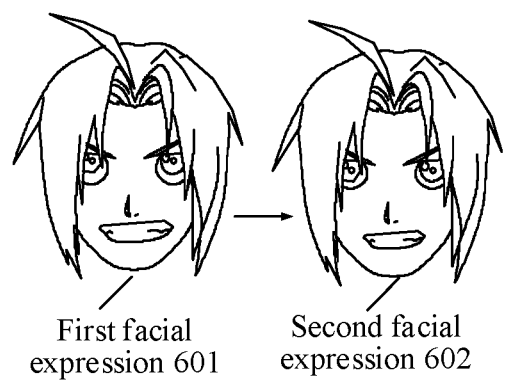
FIG. 6 is a second schematic diagram of a first facial expression and a second facial expression according to an embodiment of this disclosure.

As shown in FIG. 6, a first facial expression (joy) 601 may be adjusted in the first animation application to obtain a second facial expression (joy) 602. Compared with the first facial expression 601, the second facial expression 602 can include one or more differences. For example, the mouth of the second facial expression 602 can be smaller than the mouth of the first facial expression 601, the eyeball positions and the eye white of the second facial expression 602 and the first facial expression 601 can be slightly different, and the eye white of the second facial expression 602 can be larger.

Figure 7:
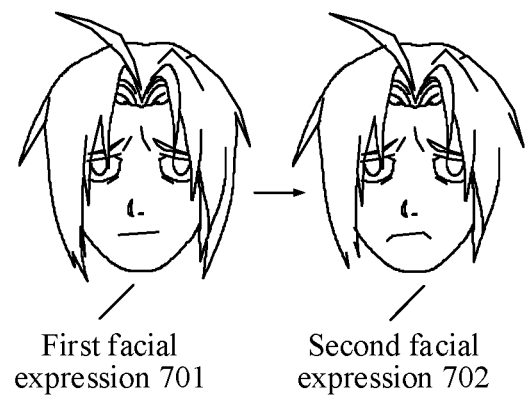
FIG. 7 is a third schematic diagram of a first facial expression and a second facial expression according to an embodiment of this disclosure.

As shown in FIG. 7, a first facial expression (grief) 701 may be adjusted in the first animation application to obtain a second facial expression (grief) 702. Compared with the first facial expression 701, the second facial expression 702 can include one or more differences. For example, the mouth of the second facial expression 702 can be more bent downward than the mouth of the first facial expression 701.

In FIG. 5, both the first facial expression 501 and the second facial expression 502 indicate an angry state of the target animation object. In FIG. 6, both the first facial expression 601 and the second facial expression 602 indicate a happy state of the target animation object. In FIG. 7, both the first facial expression 701 and the second facial expression 702 indicate a sad state of the target animation object. The first facial expression and the second facial expression are only slightly different in details of certain features which can include the eyebrows, eyes, and mouth, such as the opening size and the bending degree of the mouth, the bending degree and the length of the eyebrow, the eyeball positions of the eyes, and the size of the eye white.

Figure 8:
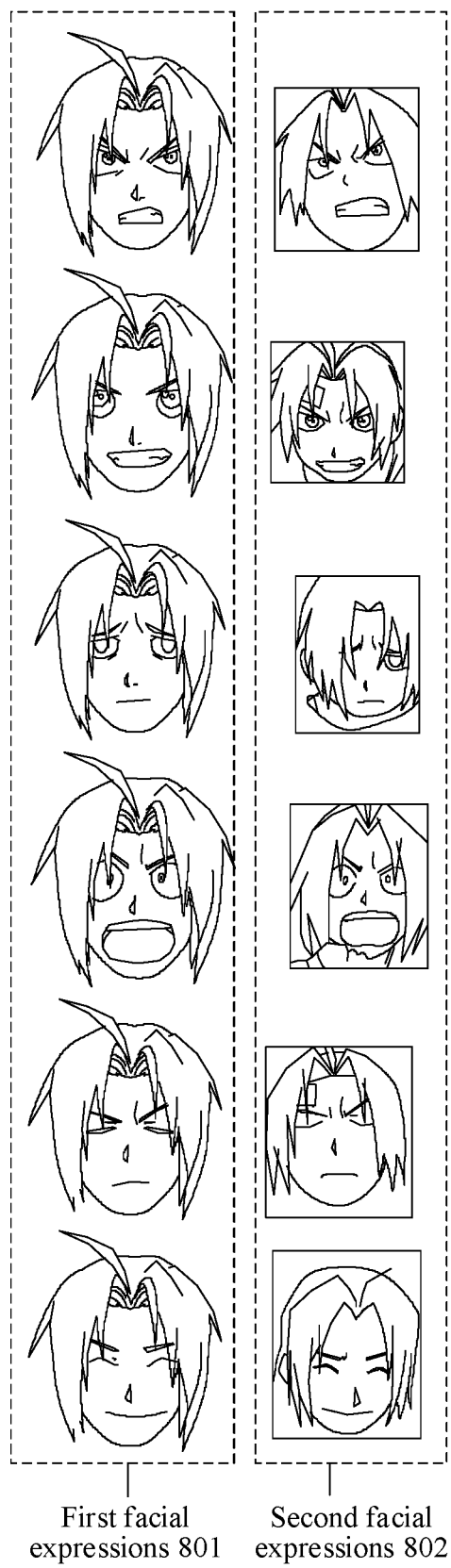
FIG. 8 is a schematic diagram of a facial expression set and a reference diagram of the facial expression set according to an embodiment of this disclosure.

For example, the first facial expression may be adjusted in the first animation application to obtain the corresponding second facial expression. When the to-be-generated target animation is created, the second facial expression may be used as the facial expression of the target animation object in one image frame of the to-be-generated target animation. As shown in FIG. 8, a left part of FIG. 8 may include various first facial expressions 801, and a right part of FIG. 8 may include various second facial expressions 802 in a target animation object in one image frame of a target animation.

It is to be understood that the foregoing is merely an example. No limitation is made to the embodiments of this disclosure.

In a process in which a facial expression of a target animation object is created, first face binding is performed on the target animation object in a first animation application, and then a first facial expression of the target animation object is acquired in the first animation application, where the first facial expression is a facial expression in a facial expression set, and the facial expression set includes different facial expressions of the target animation object that are generated in a second animation application. Finally, when a first interactive operation is acquired in the first animation application, in response to the first interactive operation, a display parameter of the first facial expression is adjusted to obtain a second facial expression. In one image frame of a to-be-generated target animation in the first animation application, the second facial expression may be used as a facial expression of the target animation object. By using the foregoing technical solutions, a facial expression set of a target animation object produced in a second animation application may be acquired, and then a display parameter of a first facial expression of the target animation object is adjusted in a first animation application to obtain a second facial expression, so that the second facial expression can be used as a facial expression of the target animation object in an image frame of a to-be-generated target animation. In this way, the display parameter of the first facial expression is adjusted to obtain the second facial expression, thereby improving facial expression production efficiency, and the second facial expression is generated based on fine adjustment of the first facial expression, so that a difference between the second facial expression and the first facial expression is relatively small, and facial expression changes of the target animation object in an image frame of the to-be-generated target animation are more smooth, thereby improving animation smoothness and achieving better display effects.

The acquiring of a first facial expression of the target animation object in the first animation application can include: loading a first expression file of the first facial expression in the first animation application, the first expression file being an expression file exported from the second animation application; and displaying, in the first animation application, the first facial expression indicated by the first facial expression file, and displaying, in an operation panel in the first animation application, the display parameter of the first facial expression and a current value of the display parameter.

In some embodiments, after the face of the target animation object is bound in the first animation application, the first facial expression of the target animation object may be acquired in the first animation application in the following manner:

The first expression file that is used for representing the first facial expression is exported in the second animation application, and then the first expression file of the first facial expression is loaded in the first animation application.

Then, the first facial expression indicated by the first facial expression file is displayed in the first animation application, and the display parameter of the first facial expression and the current value of the display parameter are displayed in the operation panel in the first animation application.

Figure 9:
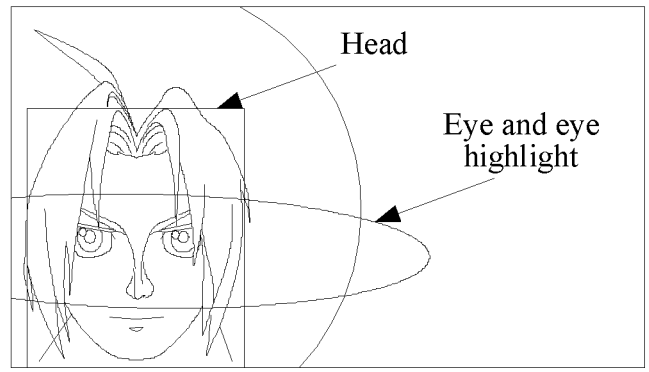
FIG. 9 is a schematic diagram of a face that binds a target animation object according to an embodiment of this disclosure.

As shown in FIG. 9, the face of the target animation object may be bound in the first animation application, for example, the head, the eyes, and the eye highlight of the target object are bound.

Figure 10:
FIG. 10 is a schematic diagram of a standard facial expression according to an embodiment of this disclosure.

A file (e.g., the first expression file) corresponding to an expression (e.g., the first facial expression) to be added may be determined, by using an editor such as Morpher included in the first animation application, in response to a click or touch operation on the pick object button in the editor. Further, the display parameter of the first facial expression indicated by the first expression file and the current value of the display parameter may be obtained. For example, a standard normal expression whose all values are 0 may be obtained as shown in FIG. 10.

It is to be understood that the foregoing is merely an example. No limitation is made to the embodiments of this disclosure.

The first expression file exported from the second animation application may be loaded into the first animation application, and the display parameter of the first facial expression in the first animation application can be displayed, so that the current value of the first facial expression can be visually seen. This can provide a basis for subsequently adjustments to the first facial expression by using the first animation application, and convenience can be greatly improved.

The display parameter may include at least one of a mouth display parameter, an eyebrow display parameter, and an eye display parameter. The adjusting of the display parameter of the first facial expression in the first animation application may be implemented in at least one of the following:

The mouth display parameter of the first facial expression can be adjusted in the first animation application, the mouth display parameter being used for determining at least one of a display position and a display curve of the mouth of the target animation object. The eyebrow display parameter of the first facial expression can be adjusted in the first animation application, the eyebrow display parameter being used for determining at least one of a display position and a display curve of the eyebrows of the target animation object. The eye display parameter of the first facial expression can be adjusted in the first animation application, the eye display parameter being used for determining at least one of a display position and a display curve of the eyes of the target animation object.

In some embodiments, when the display parameter of the first facial expression in the first animation application is adjusted, at least one of a mouth part, an eyebrow part, and an eye part of the first facial expression may be adjusted. The nose has very little impact on presentation of the facial expression, and the nose may not be adjusted.

In some embodiments, in the first animation application, the mouth display parameter of the first facial expression is adjusted, where the display parameter includes the mouth display parameter, and the mouth display parameter is used for determining at least one of the display position and the display curve of the mouth of the target animation object. The display position of the mouth of the target animation object may be understood as the position of the mouth in the entire first facial expression, and the display curve of the mouth of the target animation object may be understood as a bending degree of the mouth, an upward bending or a downward bending, an opening size of the mouth, and the like. This is not limited in embodiments of this disclosure.

In some embodiments, in the first animation application, the eyebrow display parameter of the first facial expression is adjusted, where the display parameter includes the eyebrow display parameter, and the eyebrow display parameter is used for determining at least one of the display position and the display curve of the eyebrow of the target animation object. The display position of the eyebrow of the target animation object may be understood as the position of the eyebrow in the entire first facial expression, and the display curve of the eyebrow of the target animation object may be understood as a bending degree of the eyebrow, an upward bending or a downward bending, a length of the eyebrow, and the like. This is not limited in embodiments of this disclosure.

In some embodiments, in the first animation application, the eye display parameter of the first facial expression is adjusted, where the display parameter includes the eye display parameter, and the eye display parameter is used for determining at least one of the display position and the display curve of the eye of the target animation object. The display position of the eye of the target animation object may be understood as the position of the eye in the entire first facial expression, and the display curve of the eye of the target animation object may be understood as an eyeball of the eye, a layout of eye white, and the like. This is not limited in embodiments of this disclosure.

The display parameter of the first facial expression may be adjusted, and the following parameters of the first facial expression may be adjusted. For example, the mouth display parameters mouth_aoyi_B, mouth_aoyi_D, mouth_F, mouth_C, mouth_A, and mouth_A02 of the first facial expression may be adjusted. The eyebrow display parameters eyebrow_ping, eyebrow_up, and eyebrow_think of the first facial expression may be adjusted. The eye display parameter eye aoyi of the first facial expression may be adjusted.

When the display parameter of the first facial expression in the first animation application is adjusted, at least one of the mouth part, the eyebrow part, and the eye part of the first facial expression may be adjusted, which can be convenient and flexible, thereby greatly improving flexibility and convenience of facial expression production.

To more clearly describe how the display parameter of the first facial expression is adjusted, the following provides several possible embodiments.

In an embodiment, when the display parameter includes the mouth display parameter, the adjusting of the mouth display parameter of the first facial expression in the first animation application can include adjusting the mouth display parameter of the first facial expression from a first value to a second value in the first animation application, a variation amplitude between the mouth displayed according to the second value and the mouth displayed according to the first value being less than a first threshold.

In some embodiments, in the first animation application, the mouth display parameter of the first facial expression may be adjusted from the first value (e.g., 60) to the second value (e.g., 70), where the variation amplitude between the mouth displayed according to the second value and the mouth displayed according to the first value is less than the first threshold. The first threshold is used for ensuring that the variation amplitude between the mouth of the first facial expression and the mouth of the second facial expression is not too large.

When the mouth is closed, the variation amplitude between the mouths may be understood as at least one of an upward bending degree of the mouth, a downward bending degree of the mouth, a degree of inclination of the mouth, an angle of inclination of the mouth, or a degree of bending. This is not limited in embodiments of this disclosure.

When the mouth is opened, the variation amplitude between the mouths may be understood as at least one of an opening size of the mouth, an upward bending degree of the mouth, a downward bending degree of the mouth, a degree of inclination of the mouth, an angle of inclination of the mouth, or a degree of bending. This is not limited in embodiments of this disclosure.

The mouth display parameter of the first facial expression may be adjusted in the foregoing manner, which can be convenient and flexible, and greatly improve flexibility and convenience of facial expression production.

In an embodiment, when the display parameter includes the eyebrow display parameter, the adjusting of the eyebrow display parameter of the first facial expression in the first animation application can include adjusting the eyebrow display parameter of the first facial expression in the first animation application from a third value to a fourth value, a variation amplitude between the eyebrows displayed according to the fourth value and the eyebrows displayed according to the third value being less than a second threshold.

In some embodiments, in the first animation application, the eyebrow display parameter of the first facial expression may be adjusted from the third value (e.g., 50) to the fourth value (e.g., 45), where the variation amplitude between the eyebrow displayed according to the fourth value and the eyebrow displayed according to the third value is less than the second threshold. The second threshold is used for ensuring that the variation amplitude between the eyebrow of the first facial expression and the eyebrow of the second facial expression is not too large.

The variation amplitude between the eyebrows may be understood as at least one of an upward bending degree of the eyebrow, a downward bending degree of the eyebrow, a degree of inclination of the eyebrow, or a thickness of the eyebrow. This is not limited in embodiments of this disclosure.

The eyebrow display parameter of the first facial expression may be adjusted in the foregoing manner, which can be convenient and flexible, and greatly improve flexibility and convenience of facial expression production.

In an embodiment, when the display parameter includes the eye display parameter, the adjusting of the eye display parameter of the first facial expression in the first animation application can include adjusting the eye display parameter of the first facial expression from a fifth value to a sixth value in the first animation application, a variation amplitude between the eyes displayed according to the sixth value and the eyes displayed according to the fifth value being less than a third threshold.

In some embodiments, in the first animation application, the eye display parameter of the first facial expression may be adjusted from the fifth value (e.g., 80) to the sixth value (e.g., 70), where the variation amplitude between the eye displayed according to the sixth value and the eye displayed according to the fifth value is less than the third threshold. The third threshold is used for ensuring that the variation amplitude between the eye of the first facial expression and the eye of the second facial expression is not too large.

When the eyes are closed, the variation amplitude between the eyes may be understood as at least one of a downward bending degree of the eye, a degree of inclination of the eye, or a bending degree of the eye. This is not limited in embodiments of this disclosure.

When the eyes are opened, the variation amplitude between the eyes may be understood as at least one of an opening size of the eye, a downward bending degree of the upper eyelid, an upward bending degree of the lower eyelid, the degree of inclination of the eye, the size of the eye white, or the size of the eyeball. This is not limited in embodiments of this disclosure.

The eye display parameter of the first facial expression may be adjusted in the foregoing manner, which can be convenient and flexible, and greatly improve flexibility and convenience of facial expression production.

Before the first facial expression is adjusted, the facial expression set further needs to be created by using the second animation application. An exemplary implementation process is as follows:

A standard facial expression of the target animation object can be generated in the second animation application in response to a second interactive operation acquired in the second animation application. The facial expression set can be generated in the second animation application in response to a group of interactive operations acquired in the second animation application, the group of interactive operations being used for adjusting a display parameter of the standard facial expression.

In some embodiments, when the second interactive operation is acquired in the second animation application (e.g., Maya), a standard facial expression (e.g., the facial expression shown in FIG. 10) corresponding to the target animation is generated in the second animation application in response to the second interactive operation. Then, in the second animation application, a display parameter of the standard facial expression is adjusted by responding to an acquired group of interactive operations, to generate the foregoing facial expression set.

For example, when a role (e.g., the target animation object) expression is designed, all expressions required by the role (e.g., the target animation object) may be directly performed in Maya by using Blend Shape. These expressions can include joy, anger, grief, happiness, surprise, and the like. If the role (e.g., the target animation object) is a relatively important role in a game, other small expressions that carry a character of the role, such as shyness, excitement, and greed, can be added.

A role Edward (e.g., the target animation object) is used as an example. First, normal expressions (e.g., standard facial expressions) of a normal eye, nose, and mouth are defaulted to 0, and values thereof in a channel list are 0. FIG. 10 is a standard normal expression with all values of 0 for the expression of the role Edward. Then, on this basis, Blend Shape is used for making all the expressions of the role that appear in the game. Refer to the expressions of the role that appear in the animation. In this way, final effects can be directly seen visually. Before the animation is created, whether the effects are good or poor and whether the effects are used can be seen. In this way, the expressions can be directly screened. As shown in FIG. 8, a left part of FIG. 8 may include different first facial expressions 801, and may include an expression pre-created by using Blend Shape in Maya, a right part thereof may include second facial expressions 802 corresponding to the respective first facial expression, and the second facial expressions may be an expression screenshot of a target animation object in a material animation. In this manner, a restoration degree of a role can be up to 90% or more, and performance effects of an expression in a game can be intuitively seen. The performance effects of the expression in the game can be determined without a need to combine the expression into the game.

When the facial expression set of the target animation object is created, reference may be made to an expression that is of the target animation object and that is displayed in the animation. In this way, final effects can be directly seen visually. Before the target animation is created, whether effects are good or poor and whether the effects are used can be seen. In this way, expression screening can be directly performed, thereby improving working efficiency.

The generating of the facial expression set in the second animation application in response to a group of interactive operations acquired in the second animation application can includes adjusting, in response to the group of interactive operations acquired in the second animation application, the display parameter of the standard facial expression within a target value range to obtain the facial expression set, a lower limit value of the target value range being an initial value of the display parameter of the standard facial expression, an upper limit value of the target value range being a preset target value, and the target value being used for indicating an extreme expression of the target animation object.

In some embodiments, when a group of interactive operations is acquired in the second animation application, the display parameter of the standard facial expression may be adjusted within the target value range in response to the group of interactive operations to obtain the foregoing facial expression set. The lower limit value of the target value range is the initial value of the display parameter of the standard facial expression, the upper limit value of the target value range is the preset target value, and the target value is used for indicating the extreme expression of the target animation object. When the display parameter of the standard facial expression is adjusted, a value of the display parameter is positively correlated with a change amplitude of the facial expression, that is, a larger value of the display parameter leads to a larger difference between the obtained facial expression and the standard facial expression.

For example, in a role expression of a WarChess game, Blend Shape is used for creating expression designs of all faces in Maya, and expressions of a role are represented from a data span of a target value range (Min 0—Max 100). Min 0 is a normal expression, and Max 100 is an extreme expression of the role in a mood state. These expressions can include anger, grief, joy, surprise, and the like. The mouth is used as an example. As can be seen from FIG. 10, in a standard expression, the mouth is closed, and a mouth parameter is 0. It is assumed that an extreme expression of the mouth is expressed as an angry expression 1205 in FIG. 12. In this case, the mouth parameter is 100. In a happy expression 1202 in FIG. 12, the mouth is open. In this case, the value of the mouth parameter may be a value between 0 and 100. For example, the value may be 75. In a surprise expression 1204 in FIG. 12, the mouth is also open, but an opening amplitude of the mouth is less than that of the happy expression 1202. In this case, the mouth parameter may be 30.

The first animation application may use the facial expression set created by the second animation application, and only the value needs to be adjusted in the first animation application to produce the animation of the facial expression of the target animation object, which is both standard and accurate, and has high efficiency and relatively low risk.

Figure 11:
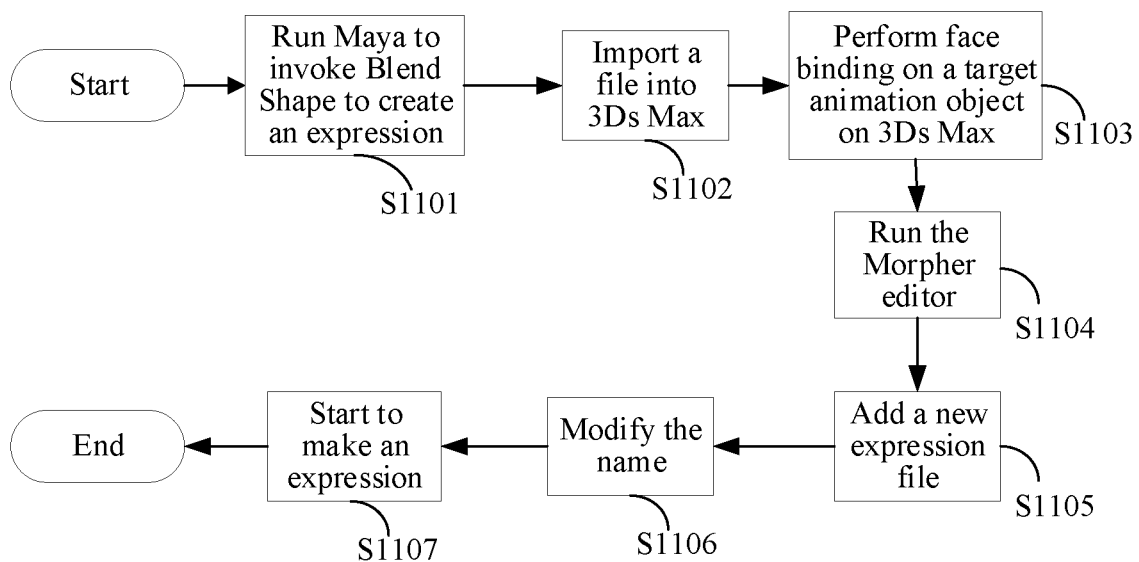
FIG. 11 is a schematic flowchart of another expression generation method for an animation object according to an embodiment of this disclosure.

The following describes an exemplary procedure of an expression generation method for an animation object with reference to an example. As shown in FIG. 11, the method may include the following steps:

In step S1101, Maya can be run to invoke Blend Shape to create an expression.

During implementation, first an expression required by a role (a target animation object) is determined, and then Blend Shape in Maya is invoked to create a corresponding expression. FIG. 4 illustrates an exemplary facial expression set required by the role (the target animation object).

In step S1102, a file can be imported into an application such as 3ds Max.

During implementation, Maya (e.g., a second animation application) model is acquired to create a Blend Shape file, and then the Blend Shape file is imported to 3ds Max.

In step S1103, face binding can be performed on the target animation object in 3ds Max.

3ds Max can correspond to the first animation application in an embodiment. As shown in FIG. 9, the head of the role (the target animation object) is bound, and the eyeball, the eye highlight, and the like of the role (the target animation object) are bound.

In step S1104, a Morpher editor can be run.

When an expression animation needs to be created, the editor Morpher included in 3ds Max (e.g., the first animation application) needs to be opened first by triggering a start operation, and in response to the start operation.

In step S1105, a new expression file can be added.

During implementation, in response to a click operation on the pick object button in the editor Morpher, an expression to be added is selected. In this case, a display parameter of the added expression may be obtained, so as to obtain a new expression file to be added.

In step S1106, the name can be changed.

To change the name of the display parameter of the added expression, it is only necessary to rename the display parameter of the added expression.

In step S1107, creation of an expression can start.

Figure 12:
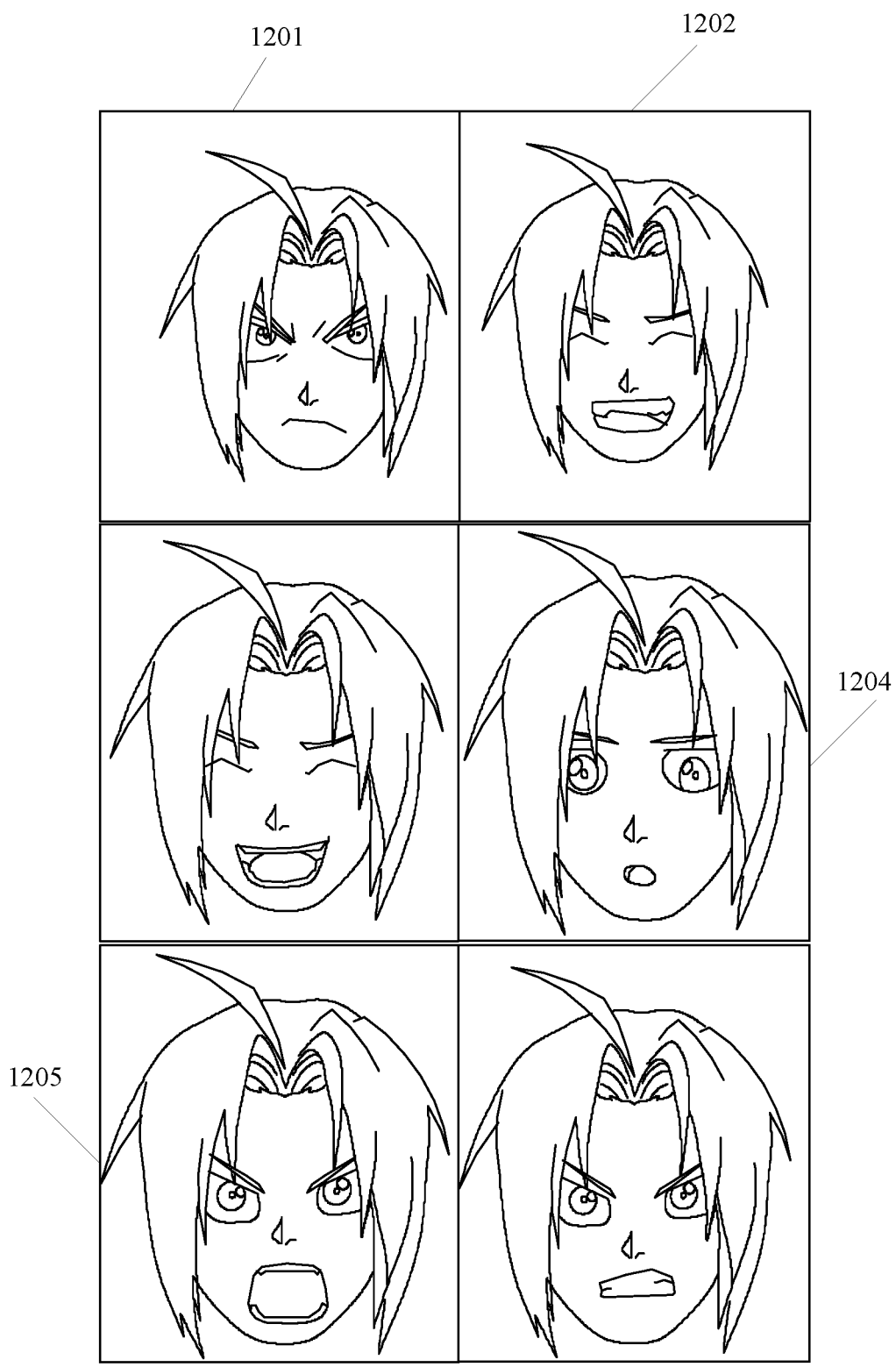
FIG. 12 is a schematic diagram of a second facial expression according to an embodiment of this disclosure.

After the foregoing operations are completed, an expression animation may be created next, and many required expression animations may be created in a permutation and combination manner. As shown in FIG. 12, a series of expressions obtained in the foregoing manner may be obtained. The expression 1201 in FIG. 12 is used as an example. Parameters of the expression are mouth F=70 and eyebrowping=70, and other parameters are all equal to 0.

A plurality of different expressions are pre-created by invoking Blend Shape in Maya, and then the expression file is imported into 3ds Max. An expression animation is created by adjusting a parameter, so that a series of diversified expressions can be obtained without cooperation of a large quantity of skeletal points.

Figure 13:
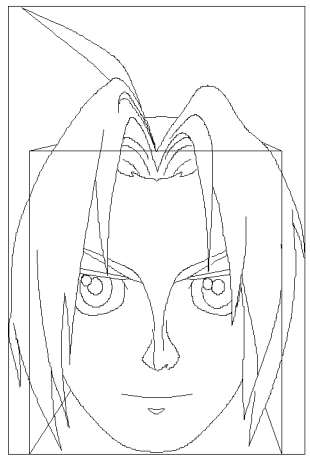
FIG. 13 is a schematic diagram of a skeleton that needs to be bound to a target animation object according to an embodiment of this disclosure.

In a process of starting animation production, as shown in FIG. 13, only five features of the skeleton, for example the head, the left and right eyeballs, and the left and right eye white are required for a role (a target animation object).

Because there is little skeleton information required, binding and animation production are more convenient. After the role is bound, the Morpher controller is used in 3ds Max to adjust the expression of the role in the production panel channel list to produce the expression animation. It can be seen that a parameter of the controller is within a range of min0—max100. A larger number tends to result in an extreme expression animation of the expression of the role. In contrast, a smaller number approaches a normal standby expression animation of the role. In this way, expression animations of different emotions shown in FIG. 12 can be made. Similar to this, various expressions may be permutated and combined, and these expressions are adjusted in a parameter manner based on Blend Shape.

Final effects of all new expressions can be seen during design by using Blend Shape in Maya. When an action is being made, an expression animation is no longer created in a traditional manner of invoking nodes, only a few skeletal points are required, and finally, the Morpher controller is adjusted in 3ds MAX to create a role expression animation, thereby improving production efficiency and improving display effects.

For brief description, the foregoing method embodiments are represented as a series of action combinations. However, a person skilled in the art is to appreciate that this disclosure is not limited to the described order of the actions, because according to this disclosure, some steps may be performed in other orders or performed at the same time. In addition, a person skilled in the art should understand that the embodiments described in this disclosure are merely exemplary, and the related actions and modules are not necessarily required.

Figure 14:
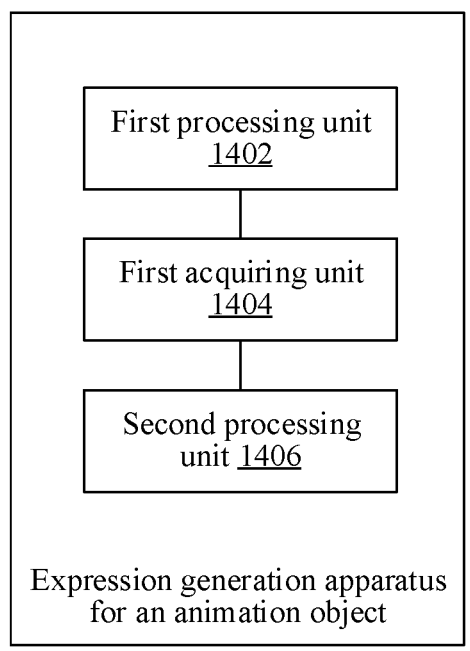
FIG. 14 is a schematic structural diagram of an expression generation apparatus for an animation object according to an embodiment of this disclosure.

An embodiment of this disclosure provides an expression generation apparatus for an animation object. One or more modules, submodules, and/or units of the apparatus can be implemented by processing circuitry, software, or a combination thereof, for example. As shown in FIG. 14, the apparatus can include a first processing unit 1402, a first acquiring unit 1404, and a second processing unit 1406.

The first processing unit 1402 can be configured to perform face binding on a target animation object in a first animation application. The first acquiring unit 1404 can be configured to acquire a first facial expression of the target animation object in the first animation application, the first facial expression being a facial expression in a facial expression set, and the facial expression set including different facial expressions of the target animation object that are generated in a second animation application. The second processing unit 1406 can be configured to adjust, in response to a first interactive operation acquired in the first animation application, a display parameter of the first facial expression to obtain a second facial expression, the second facial expression being a facial expression of the target animation object in one image frame of a target animation, and the target animation object being used for generating the target animation.

In an exemplary process in which a facial expression of a target animation object is created, first face binding is performed on the target animation object in a first animation application, and then a first facial expression of the target animation object is acquired in the first animation application, where the first facial expression is a facial expression in a facial expression set, and the facial expression set includes different facial expressions of the target animation object that are generated in a second animation application. When a first interactive operation is acquired in the first animation application, in response to the first interactive operation, a display parameter of the first facial expression is adjusted in the first animation application to obtain a second facial expression.

In one image frame of a to-be-generated target animation in the first animation application, the second facial expression may be used as a facial expression of the target animation object. By using the foregoing technical solutions, a facial expression set of a target animation object produced in a second animation application may be acquired, and then a display parameter of a first facial expression of the target animation object is adjusted in a first animation application to obtain a second facial expression, so that the second facial expression can be used as a facial expression of the target animation object in an image frame of a to-be-generated target animation. In this way, the display parameter of the first facial expression is adjusted to obtain the second facial expression, thereby improving facial expression production efficiency, and the second facial expression is generated based on fine adjustment of the first facial expression, so that a difference between the second facial expression and the first facial expression is relatively small, and facial expression changes of the target animation object in an image frame of the to-be-generated target animation are more smooth, thereby improving animation smoothness and achieving better display effects.

In some embodiments, the first acquiring unit includes a first processing module and a display module. The first processing module can be configured to load a first expression file of the first facial expression in the first animation application, the first expression file being an expression file that is exported by the second animation application and that is used for indicating the first facial expression. The display module can be configured to: display, in the first animation application, the first facial expression indicated by the first facial expression file, and display, in an operation panel in the first animation application, the display parameter of the first facial expression indicated by the first facial expression file and a current value of the display parameter.

In some embodiments, the display parameter includes at least one of a mouth display parameter, an eyebrow display parameter, and an eye display parameter, and the second processing unit includes at least one of the following: a first adjustment module, configured to adjust the mouth display parameter of the first facial expression, the mouth display parameter being used for determining at least one of a display position and a display curve of the mouth of the target animation object; a second adjustment module, configured to adjust the eyebrow display parameter of the first facial expression, the eyebrow display parameter being used for determining at least one of a display position and a display curve of the eyebrows of the target animation object; and a third adjustment module, configured to adjust the eye display parameter of the first facial expression, the eye display parameter being used for determining at least one of a display position and a display curve of the eyes of the target animation object.

In some embodiments, the first adjustment module is further configured to adjust the mouth display parameter of the first facial expression from a first value to a second value, a variation amplitude between the mouth displayed according to the second value and the mouth displayed according to the first value being less than a first threshold.

In some embodiments, the second adjustment module is further configured to adjust the eyebrow display parameter of the first facial expression from a third value to a fourth value, a variation amplitude between the eyebrows displayed according to the fourth value and the eyebrows displayed according to the third value being less than a second threshold.

In some embodiments, the third adjustment module is further configured to adjust the eye display parameter of the first facial expression from a fifth value to a sixth value, a variation amplitude between the eyes displayed according to the sixth value and the eyes displayed according to the fifth value being less than a third threshold.

In some embodiments, the apparatus further can include a third processing unit and a fourth processing unit. The third processing unit can be configured to generate a standard facial expression of the target animation object in the second animation application in response to a second interactive operation acquired in the second animation application. The fourth processing unit can be configured to generate the facial expression set in the second animation application in response to a group of interactive operations acquired in the second animation application, the group of interactive operations being used for adjusting a display parameter of the standard facial expression.

In some embodiments, the fourth processing unit is further configured to: adjust, in response to the group of interactive operations acquired in the second animation application, the display parameter of the standard facial expression within a target value range to obtain the facial expression set, a lower limit value of the target value range being an initial value of the display parameter of the standard facial expression, an upper limit value of the target value range being a preset target value, and the target value being used for indicating an extreme expression of the target animation object.

Embodiments of this disclosure include a computer-readable storage medium such as a non-transitory computer-readable storage medium, the computer-readable storage medium stores a computer program, and the computer program is configured to perform steps in any one of the foregoing method embodiments when being run.

The computer-readable storage medium may be further configured to store a computer program for performing the following steps:

In a first step, face binding can be performed on a target animation object in a first animation application.

In a second step, a first facial expression of the target animation object can be acquired in the first animation application, the first facial expression being a facial expression in a facial expression set, and the facial expression set including different facial expressions of the target animation object that are generated in a second animation application.

In a third step, in response to a first interactive operation acquired in the first animation application, a display parameter of the first facial expression can be adjusted to obtain a second facial expression, the second facial expression being a facial expression of the target animation object in one image frame of a target animation, and the target animation object being used for generating the target animation.

A person of ordinary skill in the art may understand that all or some of the steps of the methods in the foregoing embodiments may be implemented by a program instructing relevant hardware such as processing circuitry of the terminal device. The program may be stored in a computer-readable storage medium, and the storage medium may include a flash disk, a read-only memory (ROM), a random access memory (RAM), a magnetic disk, an optical disc, or the like.

Figure 15:
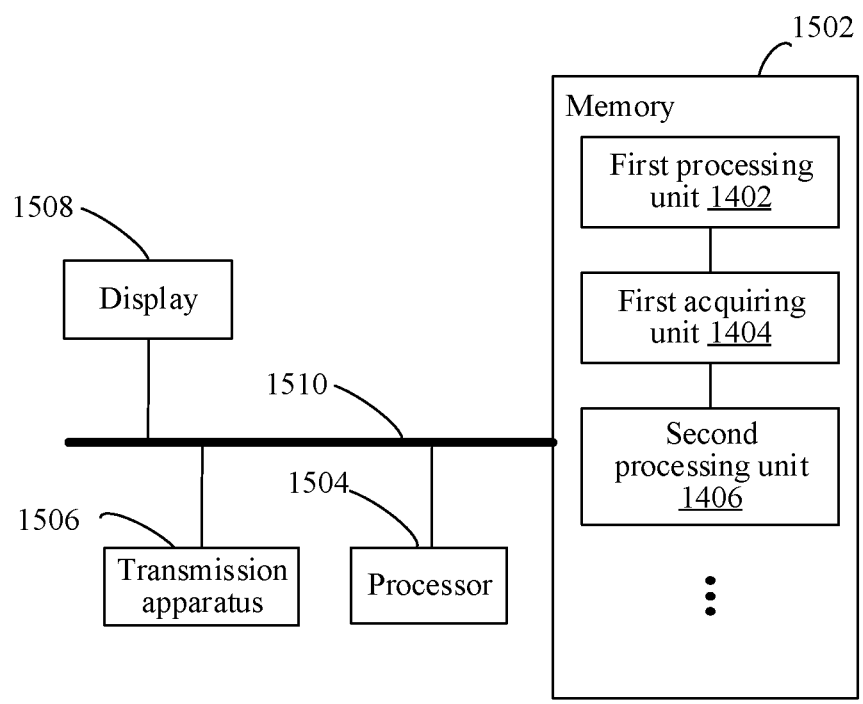
FIG. 15 is a schematic structural diagram of an electronic device according to an embodiment of this disclosure.

An embodiment of this disclosure provides an electronic device for implementing the foregoing expression generation method for an animation object. The electronic device may be the server shown in FIG. 2 or the terminal device shown in FIG. 2. The electronic device can be a terminal device that is used as an example for description. As shown in FIG. 15, the electronic device includes a memory 1502 and a processor 1504, the memory 1502 stores a computer program, and the processor 1504 or other processing circuitry is configured to perform steps in any one of the foregoing method embodiments by using the computer program.

In this embodiment of this disclosure, the processor may be configured to perform the following steps through the computer program:

In a first step, face binding can be performed on a target animation object in a first animation application.

In a second step, a first facial expression of the target animation object can be acquired in the first animation application, the first facial expression being a facial expression in a facial expression set, and the facial expression set including different facial expressions of the target animation object that are generated in a second animation application.

In a third step, in response to a first interactive operation acquired in the first animation application, a display parameter of the first facial expression can be adjusted to obtain a second facial expression, the second facial expression being a facial expression of the target animation object in one image frame of a target animation, and the target animation object being used for generating the target animation.

A person of ordinary skill in the art may understand that the structure shown in FIG. 15 is only for the purpose of illustration, and does not constitute a limitation to the structure of the foregoing electronic device. For example, the electronic device may further include more or fewer components (e.g., a network interface) than those shown in FIG. 15, or have a configuration different from that shown in FIG. 10.

The memory 1502 may be configured to store a software program and a module, for example, a program command/module corresponding to the expression generation method and apparatus for an animation object in the embodiments of this disclosure. The processor 1504 executes various functional applications and data processing by running the software program and the module that are stored in the memory 1502, that is, implements the foregoing expression generation method for an animation object. The memory 1502 may include a high-speed random memory, and may also include a non-volatile memory, for example, one or more magnetic storage apparatuses, a flash memory, or another non-volatile solid-state memory. In some embodiments, the memory 1502 may further include memories remotely disposed relative to the processor 1504, and these remote memories may be connected to the terminal through a network. Examples of the network include, but are not limited to, the Internet, an intranet, a local area network, a mobile communications network, and a combination thereof. As an example, as shown in FIG. 15, the memory 1502 may include but is not limited to the first processing unit 1402, the first acquiring unit 1404, and the second processing unit 1406 in the foregoing expression generation apparatus for an animation object. In addition, the memory may further include but is not limited to another module unit in the foregoing expression generation apparatus for an animation object. Details are not described in this example.

In some embodiments, the transmission apparatus 1506 is configured to receive or transmit data by using a network. The foregoing network may include a wired network and a wireless network. In an example, the transmission apparatus 1506 includes a network interface controller (NIC). The NIC may be connected to another network device and a router by using a network cable, to communicate with the Internet or a local area network. In an example, the transmission device 1506 is a radio frequency (RF) module, which communicates with the Internet in a wireless manner.

In addition, the electronic device further includes a display 1508, configured to display the first facial expression, and a connection bus 1510, configured to connect various module components in the electronic device.

In other embodiments, the terminal or server may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network.

A person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

When the integrated unit in the foregoing embodiments is implemented in the form of a software function unit and sold or used as an independent product, the integrated unit may be stored in the foregoing computer-readable storage medium. Based on such an understanding, technical solutions of this disclosure may be implemented in a form of a software product. The computer software product is stored in a storage medium and includes several instructions for instructing one or more computer devices (which may be a personal computer, a server, a network device, or the like) to perform all or some of the steps of the methods described in the embodiments of this disclosure.

In the foregoing embodiments of this disclosure, the descriptions of the embodiments have respective focuses. For a part that is not described in detail in an embodiment, reference may be made to related descriptions in other embodiments.

This disclosure provides a computer program product or a computer program, the computer program product or the computer program includes computer instructions, and the computer instructions are stored in a computer-readable storage medium. A processor of a computer device reads the computer instruction from the computer readable storage medium, and the processor executes the computer instruction, so that the computer device performs methods provided in various implementations of the foregoing expression generation method for an animation object.

In this embodiment of this disclosure, the foregoing computer program product or computer program may be set to perform the following steps:

First, face binding can be performed on a target animation object in a first animation application.

Second, a first facial expression of the target animation object can be acquired in the first animation application, the first facial expression being a facial expression in a facial expression set, and the facial expression set including different facial expressions of the target animation object that are generated in a second animation application.

Third, in response to a first interactive operation acquired in the first animation application, a display parameter of the first facial expression can be adjusted in the first animation application to obtain a second facial expression, the second facial expression being a facial expression of the target animation object in one image frame of a target animation, and the target animation object being used for generating the target animation.

In the several embodiments provided in this disclosure, it is to be understood that the disclosed client may be implemented in another manner. The described apparatus embodiment is merely exemplary. For example, the unit division is merely logical function division and may be other division in actual implementation. For example, multiple units or components may be combined or integrated into another system, or some features may be omitted or not performed. In addition, the coupling, or direct coupling, or communication connection between the displayed or discussed components may be the indirect coupling or communication connection using some interfaces, units, or modules, and may be in electrical or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An expression generation method for an animation object, the expression generation method comprising:
   acquiring, by a first animation application, a first facial expression of a target animation object from a facial expression set generated by a second animation application, the facial expression set including different facial expressions of the target animation object;
   adjusting, by processing circuitry that executes the first animation application, a facial expression display parameter of the first facial expression in the first animation application based on a first user input to obtain a second facial expression of the target animation object, a value of the facial expression display parameter being adjusted such that a difference between the first facial expression and the second facial expression is less than a threshold; and
   generating a target animation of the target animation object that includes an image frame of the second facial expression.

2. The expression generation method according to claim 1, further comprising:
   binding skin to a face of the target animation object in the first animation application,
   wherein the first animation application and the second animation application are different 3D animation applications.

3. The expression generation method according to claim 1, wherein
   the first animation application is 3ds Max, and
   the second animation application is Maya.

4. The expression generation method according to claim 1, wherein the acquiring comprises:
   loading a first facial expression file of the first facial expression in the first animation application, the first facial expression file being exported from the second animation application;
   displaying, in the first animation application, the first facial expression indicated by the first facial expression file; and
   displaying, in an operation panel in the first animation application, the facial expression display parameter of the first facial expression and a current value of the facial expression display parameter.

5. The expression generation method according to claim 1, wherein
   the facial expression display parameter includes at least one of a mouth display parameter, an eyebrow display parameter, or an eye display parameter; and
   the adjusting the facial expression display parameter includes at least one of:
   adjusting the mouth display parameter of the first facial expression, the mouth display parameter corresponding to at least one of a display position or a display curve of a mouth of the target animation object,
   adjusting the eyebrow display parameter of the first facial expression, the eyebrow display parameter corresponding to at least one of a display position or a display curve of eyebrows of the target animation object, or
   adjusting the eye display parameter of the first facial expression, the eye display parameter corresponding to at least one of a display position or a display curve of eyes of the target animation object.

6. The expression generation method according to claim 5, wherein
   the facial expression display parameter includes the mouth display parameter, and
   the adjusting the mouth display parameter of the first facial expression includes adjusting the mouth display parameter of the first facial expression from a first value to a second value, a difference between the mouth displayed according to the second value and the mouth displayed according to the first value being less than a first threshold.

7. The expression generation method according to claim 5, wherein
   the facial expression display parameter includes the eyebrow display parameter, and
   the adjusting the eyebrow display parameter of the first facial expression includes adjusting the eyebrow display parameter of the first facial expression from a third value to a fourth value, a difference between the eyebrows displayed according to the fourth value and the eyebrows displayed according to the third value being less than a second threshold.

8. The expression generation method according to claim 5, wherein
   the facial expression display parameter includes the eye display parameter, and
   the adjusting the eye display parameter of the first facial expression includes adjusting the eye display parameter of the first facial expression from a fifth value to a sixth value, a difference between the eyes displayed according to the sixth value and the eyes displayed according to the fifth value being less than a third threshold.

9. The expression generation method according to claim 1, wherein the facial expression set is generated by the second animation application based on a standard facial expression of the target animation object and adjustments to a display parameter of the standard facial expression.

10. The expression generation method according to claim 9, wherein the display parameter of the standard facial expression is adjusted within a target value range to obtain the facial expression set, a lower limit value of the target value range being an initial value of the display parameter of the standard facial expression, an upper limit value of the target value range being a preset target value, and the preset target value indicating an extreme expression of the target animation object.

11. An expression generation apparatus, comprising:
processing circuitry configured to execute a first animation application, the first animation application being configured to
acquire a first facial expression of a target animation object from a facial expression set generated by a second animation application, the facial expression set including different facial expressions of the target animation object;
adjust a facial expression display parameter of the first facial expression in the first animation application based on a first user input to obtain a second facial expression of the target animation object, a value of the facial expression display parameter being adjusted such that a difference between the first facial expression and the second facial expression is less than a threshold; and
generate a target animation of the target animation object that includes an image frame of the second facial expression.

12. The expression generation apparatus according to claim 11, wherein
the first animation application is configured to bind skin to a face of the target animation object in the first animation application, and
the first animation application and the second animation application are different 3D animation applications.

13. The expression generation apparatus according to claim 11, wherein the first animation application is configured to:
load a first facial expression file of the first facial expression in the first animation application, the first facial expression file being exported from the second animation application;
display, in the first animation application, the first facial expression indicated by the first facial expression file; and
display, in an operation panel in the first animation application, the facial expression display parameter of the first facial expression and a current value of the facial expression display parameter.

14. The expression generation apparatus according to claim 11, wherein
the facial expression display parameter includes at least one of a mouth display parameter, an eyebrow display parameter, or an eye display parameter; and
the first animation application is configured to perform at least one of:
adjustment of the mouth display parameter of the first facial expression, the mouth display parameter corresponding to at least one of a display position or a display curve of a mouth of the target animation object;
adjustment of the eyebrow display parameter of the first facial expression, the eyebrow display parameter corresponding to at least one of a display position or a display curve of eyebrows of the target animation object; or
adjustment of the eye display parameter of the first facial expression, the eye display parameter corresponding to at least one of a display position or a display curve of eyes of the target animation object.

15. The expression generation apparatus according to claim 14, wherein
the facial expression display parameter includes the mouth display parameter, and
the first animation application is configured to adjust the mouth display parameter of the first facial expression from a first value to a second value, a difference between the mouth displayed according to the second value and the mouth displayed according to the first value being less than a first threshold.

16. The expression generation apparatus according to claim 14, wherein
the facial expression display parameter includes the eyebrow display parameter, and
the first animation application is configured to adjust the eyebrow display parameter of the first facial expression includes adjusting the eyebrow display parameter of the first facial expression from a third value to a fourth value, a difference between the eyebrows displayed according to the fourth value and the eyebrows displayed according to the third value being less than a second threshold.

17. The expression generation apparatus according to claim 14, wherein
the facial expression display parameter includes the eye display parameter, and
the first animation application is configured to adjust the eye display parameter of the first facial expression includes adjusting the eye display parameter of the first facial expression from a fifth value to a sixth value, a difference between the eyes displayed according to the sixth value and the eyes displayed according to the fifth value being less than a third threshold.

18. The expression generation apparatus according to claim 11, wherein the facial expression set is generated by the second animation application based on a standard facial expression of the target animation object and adjustments to a display parameter of the standard facial expression.

19. The expression generation apparatus according to claim 18, wherein the display parameter of the standard facial expression is adjusted within a target value range to obtain the facial expression set, a lower limit value of the target value range being an initial value of the display parameter of the standard facial expression, an upper limit value of the target value range being a preset target value, and the preset target value indicating an extreme expression of the target animation object.

20. A non-transitory computer-readable storage medium, storing instructions which when executed by at least one processor cause the at least one processor to perform:
acquiring, by a first animation application, a first facial expression of a target animation object from a facial expression set generated by a second animation application, the facial expression set including different facial expressions of the target animation object;
adjusting a facial expression display parameter of the first facial expression in the first animation application based on a first user input to obtain a second facial expression of the target animation object, a value of the facial expression display parameter being adjusted such that a difference between the first facial expression and the second facial expression is less than a threshold; and
generating a target animation of the target animation object that includes an image frame of the second facial expression.

* * * * *